(12) United States Patent
Dent

(10) Patent No.: US 6,925,127 B1
(45) Date of Patent: Aug. 2, 2005

(54) METHOD AND APPARATUS FOR SUBTRACTING MULTIPLE RAYS OF MULTIPLE INTERFERING RECEIVED SIGNALS

(75) Inventor: Paul W. Dent, Pittsboro, NC (US)

(73) Assignee: Ericsson Inc., Research Triangle Park, NC (US)

( * ) Notice: Subject to any disclaimer, the term of this patent is extended or adjusted under 35 U.S.C. 154(b) by 712 days.

(21) Appl. No.: 09/680,901

(22) Filed: Oct. 6, 2000

Related U.S. Application Data

(63) Continuation-in-part of application No. 09/340,907, filed on Jun. 28, 1999, now Pat. No. 6,680,928, and a continuation-in-part of application No. 09/082,722, filed on May 21, 1998, now Pat. No. 6,359,874, and a continuation-in-part of application No. 08/898,392, filed on Jul. 22, 1997, now Pat. No. 6,215,762.

(51) Int. Cl.$^7$ ................................. H04B 1/00
(52) U.S. Cl. ...................................... 375/260
(58) Field of Search ................. 375/242, 243, 375/245, 130, 140, 260, 144, 148, 150; 704/222, 230, 503

(56) References Cited

U.S. PATENT DOCUMENTS

| | | |
|---|---|---|
| 5,151,919 A | 9/1992 | Dent |
| 5,204,874 A * | 4/1993 | Falconer et al. ............ 375/130 |

(Continued)

FOREIGN PATENT DOCUMENTS

| | | |
|---|---|---|
| EP | 0491668 A2 | 6/1992 |
| WO | WO 00/51260 | 8/2000 |

OTHER PUBLICATIONS

Arslan et al., "New Methodsfor Adaptive Noise Suppression", IEEE International Conference on Acoustics, Speech, and Signal Processing, 1995, vol. 1, May 9–12, 1995, pp. 812 815.*

International Search Report, PCT/US01/28317; Aug. 29, 2002.

Shimon Moshavi, Bellcore; *Multi–User Detection for DS–CDMA Communications;* IEEE Communications Magazine, vol. 34, No. 10, Oct. 1996, pp. 124–136.

(Continued)

*Primary Examiner*—Mohammed Ghayour
*Assistant Examiner*—Dung X. Nguyen
(74) *Attorney, Agent, or Firm*—Myers Bigel Sibley & Sajovec, PA

(57) ABSTRACT

A receiver decodes quantized and unquantized wanted data symbols from received signal samples. The receiver comprises a control adapted to process a group of currently received signal samples to determine a corresponding current set of unquantized wanted data symbols and an interfering waveform representative of a sum of other unwanted data symbols by subtracting an amount of a previously decoded set of quantized wanted symbols and a previously determined interfering waveform. A quantizer quantizes the determined current set of unquantized wanted symbols to obtain corresponding quantized symbols.

48 Claims, 4 Drawing Sheets

U.S. PATENT DOCUMENTS

| | | | |
|---|---|---|---|
| 5,218,619 A | | 6/1993 | Dent |
| 5,533,012 A | * | 7/1996 | Fukasawa et al. ............ 370/18 |
| 5,572,552 A | | 11/1996 | Dent et al. |
| 5,652,764 A | * | 7/1997 | Kanzaki et al. ............. 375/130 |
| 5,673,291 A | | 9/1997 | Dent |
| 5,761,237 A | * | 6/1998 | Petersen et al. ............ 375/148 |
| 5,937,015 A | | 8/1999 | Dent et al. |
| 6,134,215 A | * | 10/2000 | Agrawal et al. ............ 370/209 |
| 6,215,814 B1 | * | 4/2001 | Ylitalo et al. ............... 375/148 |
| 6,522,683 B1 | * | 2/2003 | Smee et al. .................. 375/144 |
| 6,581,032 B1 | * | 6/2003 | Gao et al. ................... 704/222 |
| 6,664,913 B1 | * | 12/2003 | Craven et al. .............. 341/200 |

OTHER PUBLICATIONS

Im et al.; *An Iterative Decorrelator with Multipath Combiners for CDMA Frequency–Selective Fading Channels;* VTC–2000–Spring, 2000 IEEE 51$^{st}$, Vehicular Technology Conference Proceedings, Tokyo, Japan, May 15–18, 2000, vol. 1 of 3 Conf. 51, May 15, 2000, pp. 537–541.

Witjting et al.; *Groupwise Serial Multiuser Detectors for Multirate DS–CDMA;* Vehicular Technology Conference, 1999 IEEE, May 16, 1999, pp. 836–840.

Markku J. Juntti; *Performance of Multiuser Detection in Multirate CDMA Systems;* Wireless Personal Communications, vol. 11, No. 3, Dec. 1999, pp. 293–311.

Patel et al.; *Analysis of a Simple Successive Interference Cancellation Scheme in a DS/CDMA System;* IEEE Journal on Selected Areas in Communications; vol. 12, No. 5, Jun. 1994, pp. 796–807.

Beheshti et al.; *Joint Intersymbol and Multiple–Access Interference Suppression Algorithms for CDMA Systems;* European Transactions on Telecommunications, Eurel Publication, vol. 9, No. 5, Sep. 1, 1998, pp. 403–418.

* cited by examiner

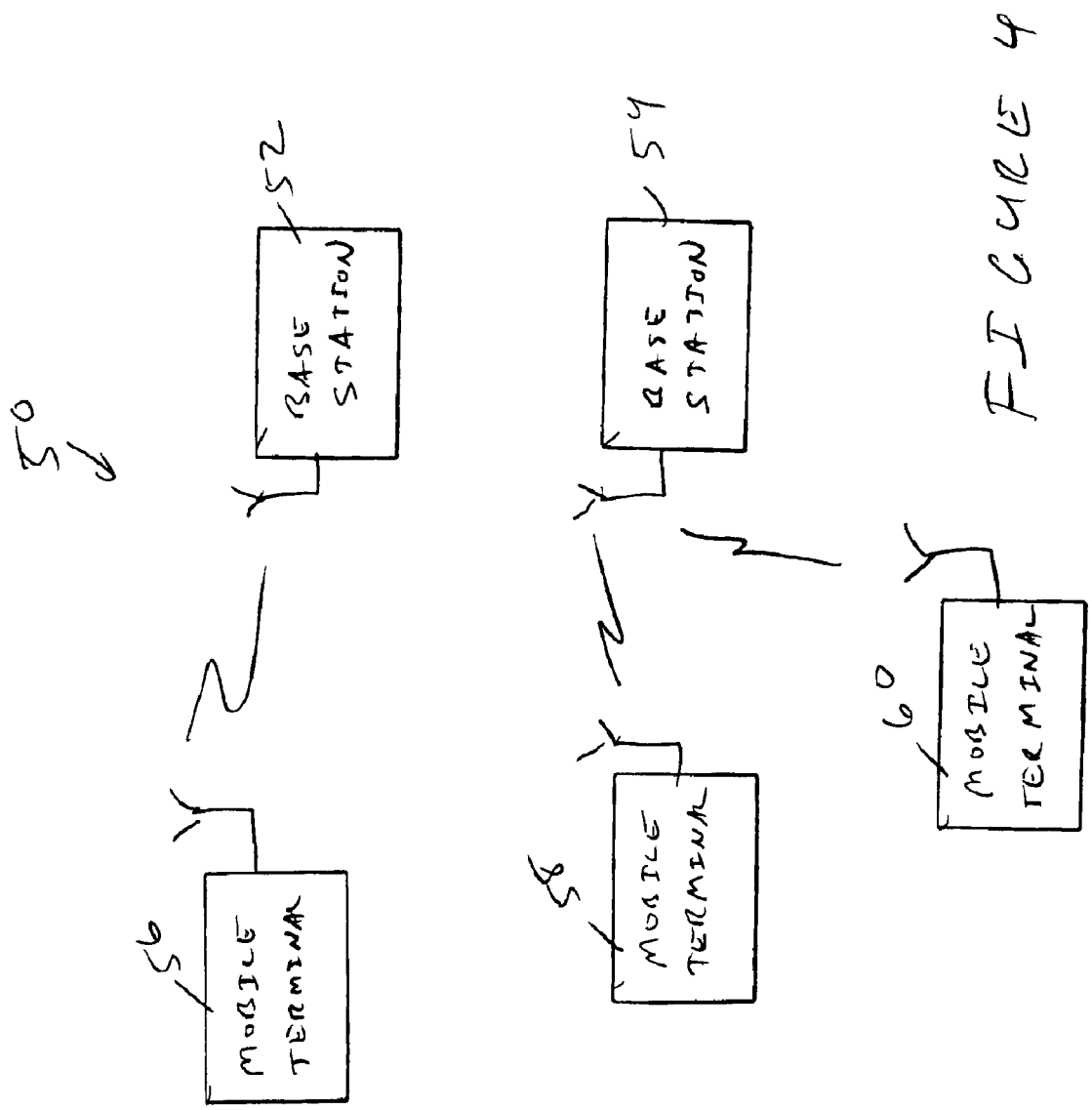

METHOD AND APPARATUS FOR SUBTRACTING MULTIPLE RAYS OF MULTIPLE INTERFERING RECEIVED SIGNALS

CROSS REFERENCE

This application is a Continuation-In-Part to U.S. patent application Ser. No. 09/082,722, filed May 21, 1998, now U.S. Pat. No. 6,359,874; U.S. patent application Ser. No. 08/898,392, filed Jul. 22, 1997, now U.S. Pat. No. 6,215,762; and U.S. patent application Ser. No. 09/340,907, filed Jun. 28, 1999, now U.S. Pat. No. 6,680,928, each to applicant, which are the parent applications for this application and form part of this application in their entirety.

BACKGROUND OF THE INVENTION

This invention relates to decoding of received signals and, more particularly, to decoding quantized and unquantized wanted data symbols from received signal samples.

The code-division multiple access (CDMA) mobile communications system known as IS95 transmits from a base station to different mobile terminals in its coverage area (the downlink) using different 64-bit orthogonal codes. Each such code is of the same length (64 bits) and carries voice or data traffic of approximately the same data rate. Variable-rate orthogonal coding is not used in that system.

A wideband CDMA system known as 3G (third generation) has been standardized in a cooperation between the European Telecommunications Standards Institute (ETSI) and NTT DoCoMo of Japan, and specifies variable-rate orthogonal coding in which signals of higher bitrate can use orthogonal codes of a shorter length to increase the frequency of data symbol transmission while still remaining orthogonal to lower bitrate transmissions using longer orthogonal codes and a lower frequency of data symbol transmission. The shortest orthogonal code presently specified is 4 chips long and the longest is 256 chips long.

Also in IS95, transmissions from mobile terminals to base stations use orthogonal codes to code different data symbol groups from the same mobile terminal but do not use orthogonal codes to distinguish between different mobile terminals. Different mobile terminal transmissions (the uplink) are distinguished by the use of different non-orthogonal, pseudorandom codes.

U.S. Pat. No. 5,151,919 entitled "CDMA Subtractive Demodulation" and U.S. Pat. No. 5,218,619 also entitled "CDMA Subtractive Demodulation" to Applicant describe a CDMA system using orthogonal codes in the manner of the above-described IS95 uplink, in which different signals are successively decoded and subtracted in order from strongest to weakest in order to eliminate interference of the stronger signals upon the weaker signals. The '919 and '619 patents are hereby incorporated by reference herein.

In U.S. Pat. No. 5,572,552 entitled "Method and system for demodulation of downlink CDMA signals", Dent and Bottomley describe an optimum receiver for receiving CDMA signals at a mobile terminal transmitted from a cellular base station that subtracts non-orthogonal multipath rays in a multipath channel equalizer when own-base interference is dominant. Such a "channel inverse" equalizer is disclosed to be non-optimum in the presence of other-base interference or thermal noise and a hybrid equalizer method is described that lies between the conventional RAKE equalizer method and the channel inverse equalizer method. The '552 patent is hereby incorporated by reference herein.

In U.S. patent application Ser. No. 09/082,722, filed May 21, 1998, entitled "Partially Block-interleaved CDMA Coding and Decoding" to Applicant, methods for transmitting and receiving orthogonally-coded CDMA signals are described such that signals retain their orthogonality for most transmitted data symbols under multipath conditions. The above application is hereby incorporated by reference herein.

In U.S. Patent application Ser. No. 08/898,392, filed Jul. 22, 1997, entitled "Orthogonal Block-Spreading Codes for the Multipath Environment") further methods are described for compensating for multi-user interference on the residual symbols not retaining their mutual orthogonality by virtue of the Block-interleaving method. This application is hereby incorporated by reference herein.

Also, in U.S. patent application Ser. No. 09/340,907, filed Jun. 28, 1999, entitled "Multi-Carrier Orthogonal Coding", methods are disclosed for transmitting and receiving CDMA signals that are orthogonally coded over more than one frequency channel. This application is hereby incorporated by reference herein.

SUMMARY OF THE INVENTION

A Code Division Multiple Access system using orthogonal codes of variable length to reduce interference between transmissions to different receivers of different underlying information rates transmits a sum of all signals to a receiver, which processes the received signal to separate a signal of highest bitrate from the remaining signals to substantially eliminate interference from the lower bitrate signals to the highest bitrate signal. The receiver may continue to process the residual signal after subtracting the separated highest bitrate signal to decode at least one of the lower bitrate signals thereby substantially eliminating interference from the highest bitrate signal to the lower bitrate signals.

BRIEF DESCRIPTION OF THE DRAWINGS

FIG. 4 illustrates a mobile communications system.

DETAILED DESCRIPTION OF THE INVENTION

Figure 1:
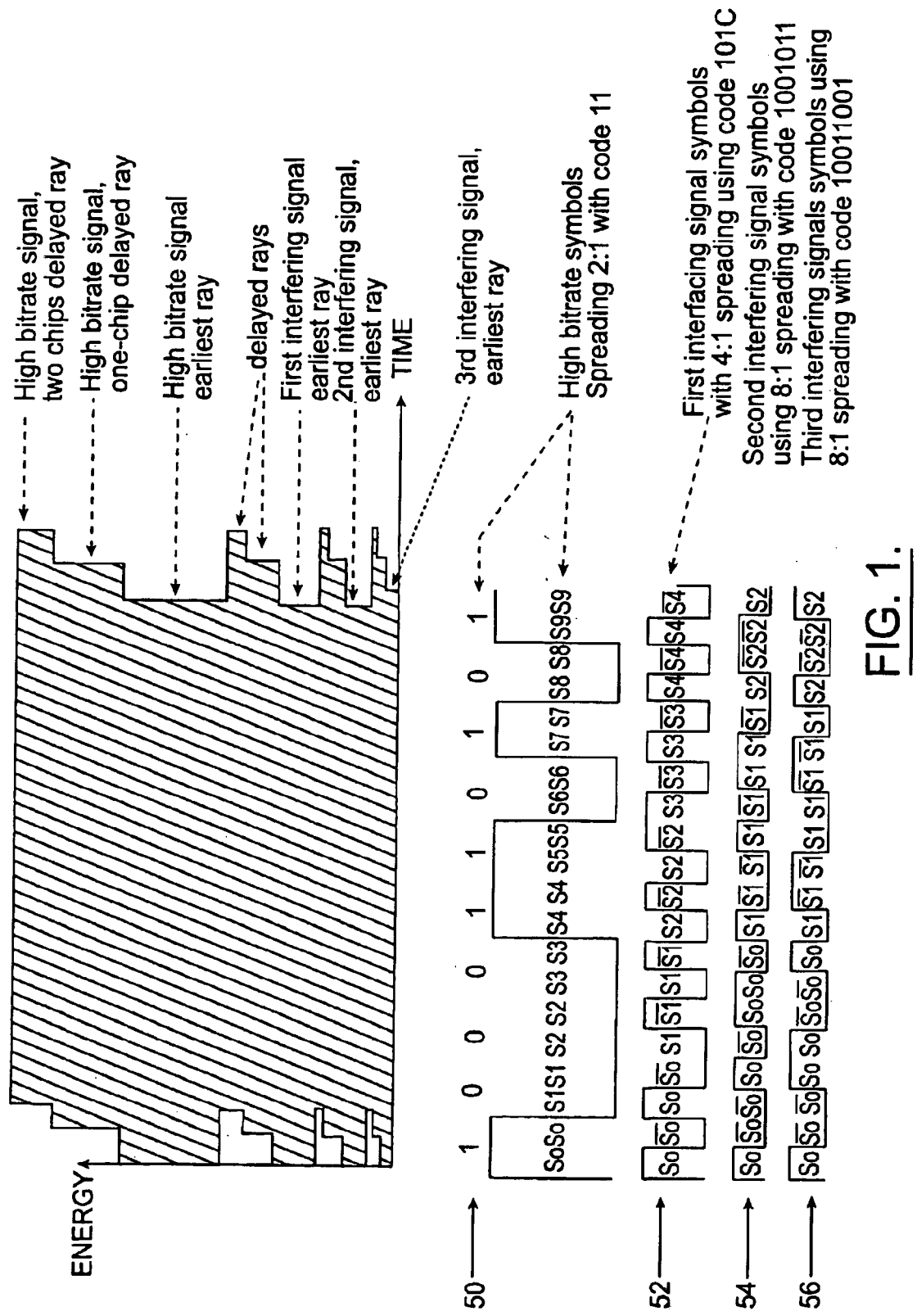
FIG. 1 is a series of waveforms illustrating a wanted signal and a plurality of interfering signals, and energy amounts produced by said signals.

FIG. 1 illustrates an exemplary signal transmitted by a wireless base station employing orthogonal CDMA codes. In this example, a single, high-power, high datarate signal employing a short (2-chip) repeated code "x,y", where x and y are spreading code values, overlaps transmission with a multiplicity of other, orthogonal signals employing longer codes that always comprise pairs of spreading code values "x,-y" in succession. For example, x and y could be binary 1's giving a spreading code "11" and then x and -y in Boolean notation would be "10". Complex values "1,j" and "1,j" are other examples of orthogonal chip pairs.

One implementation of the invention is described for the example where a high bit rate signal uses the spreading code "11" for successive transmitted symbols while lower bit rate signals use codes such as 10 01 01 10, i.e. always a zero paired with a one in any chip pair corresponding to the chip pairs "11" of the high bit rate signal.

Assume the wanted symbols are $S_0, S_1, S_2 \ldots$ and are transmitted with spreading code 11, i.e. as S0 S0 S1 S1 S2 S2 S3 S3 etc. All of the other signals have spreading codes having 10 or 01 bit pairs following each other. If on the first chip of each pair the other signals with levels a,b,c ... etc combine to give a+b−c−d ... etc, then on the second chip of each pair they have to give −(a+b−c−d ...) i.e. the interfering waveform values due to the sum of all other signals are W0−W0 W1−W1 W2−W2 W3−W3 ... etc So the total transmitted signal waveform samples may be written as:—

S0+W0 S0−W0 S1+W1 S1−W1 S2+W2 S2−W2 ... ETC

These are received through some multipath channel comprising a shortest path or ray of earliest time-of-arrival with amplitude and phase described by the complex number Co, and other multipath rays or echos with successive delays of 1 chip, 2 chips etc of amplitude and phase described by complex numbers C1,C2 etc.

It is possible to include a filter in the receiver ahead of all other processing which has the effect of ensuring that earlier paths or "taps" after applying such a pre-filter contain the most energy, and coefficients Co,C1,C2 ... now include the effect of the receive prefilter as well as the multipath propagation channel and any transmit filtering employed. The earlier paths communicate the latest symbols and the later paths are echoes of earlier symbols.

Received signal sample values Z0, Z1, Z2 ... are thus described by:

$Co(S0+W0)+C1(S_{-1}-W_{-1})+$earlier symbols ... $=Z0$ $C0(S0-W0)+C1(S0+W0)+$earlier symbols ... $=Z1$ Assume that the earlier symbols such as $S_{-1}$ and interfering waveform values $W_{-1}$ have already been separated from each other in a previous iteration, and the desire is now to separate So from Wo. Terms involving earlier values of S and W can thus be subtracted from both sides leaving modified values Zo', Z1' on the RHS, giving the 2×2 matrix equation:

$$\begin{pmatrix} C0 & C0 \\ C1+C0 & C1-C0 \end{pmatrix} \times \begin{pmatrix} S0 \\ W0 \end{pmatrix} = \begin{pmatrix} Z0' \\ Z1' \end{pmatrix}$$

Such equations can be solved so long as the determinant of the matrix does not approach zero, and the determinant of the above coefficient matrix is clearly the same as the determinant of the matrix $$\begin{pmatrix} Co & Co \\ Co & -Co \end{pmatrix}$$

which is $-2Co^2$ and never zero or ill-conditioned, due to choosing the prefilter so that Co is as large as possible.

The equations can thus be solved for So and Wo, obtaining $So=(Zo'+Z1')/2Co-C1.Zo'/2Co^2$ $Wo=(Zo'-Z1')/2Co+C1.Zo'/2Co^2$ and those values can be fed forward after quantizing So to a nearest symbol in the alphabet when resolving S1 and W1 from the next two signal samples.

One known method in which previously decoded symbols are fed forward to cancel intersymbol interference (ISI) when decoding future symbols is called Decision Feedback Equalization or DFE. Prior art DFE was concerned only with interference between symbols of a wanted symbol stream, and not with interference from unwanted signals. Moreover, in pure DFE according to the prior art all fed forward symbols were quantized or "decided" to nearest legal values in the symbol alphabet. In the above formulation however, it is seen that the values fed forward comprise a mixture of quantized values like So which represent cancellation of ISI from one wanted symbol to the next and unquantized values like Wo which represent the sum of all other, unwanted signals.

Thus all other interferers emanating from the same base station transmitter are subtracted in one shot at the same time as the wanted signal is equalized for multipath propagation, when practicing the above method.

In DFE methods, the multipath ray that principally contributes to deciding the value of a data symbol is the ray with coefficient Co, while the rays with coefficients C1,C2 ... are treated as unwanted interference and subtracted.

In the alternative Viterbi Maximum Likelihood Sequence Estimator (MLSE), all rays are regarded as providing useful clues to a data symbol's value. One explanation of MLSE is that all possible decodings for the current symbol are retained along with a metric for each, indicative of the error between the unquantized value of So and each quantized value. Then the next symbol is decoded once for each of the retained assumptions being fed forward in turn, to obtain multiple decodings for the next symbol. Then, of all possible decodings for the next symbol S1 giving a particular value of S1, that having the lowest cumulative metric is retained, along with the value of So that was fed forward to obtain it. When this is repeated for each particular value of S1, a full set of possible retained S1 values is obtained, each with a cumulative metric and the associated history of fed forward symbols. It is also possible to use MLSE to hypothesize "future" symbols, such as S2 when decoding S1, as well as retaining all values of So to feed forward. It is then possible to decode a signal having passed through a channel for which Co is not the earliest significant ray, there being an even earlier ray with coefficient $C_{-1}$ that multiplies the "future" symbol. When hypothesizing two symbols to-decode another, the number of retained results corresponds to all combinations of the last two symbols, and therefore the number of metrics is also greater. The collection of hypothesized symbols with their associated path histories and cumulative metrics form the Viterbi "States". The Viterbi MLSE algorithm is useful when no good receive prefilter can be found that makes Co the largest channel coefficient, and so long as the collection of states to deal with future symbol hypotheses does not become too numerous. When the MLSE algorithm is used with the current invention, there is not only a saved path history of decided symbols So,S1,S2 ... associated with each state but also a saved history of the associated unquantized values Wo,W1, W2 ... etc.

When the above-described DFE or Viterbi interference cancelling decoder has operated to decode the high bit rate symbol stream So,S1,S2 ... etc it will also thus have separated out a stream of unquantized values Wo,W1,W2 ... etc which represent the sum of all the other signals, also compensated for multipath distortion. It is possible to save and then further process these unquantized values to decode any of the other signals contained therein, for example by despreading a signal using the rest of its orthogonal code (it was already despread by the first factor of 2) and now it will be found that the other signals are perfectly orthogonal, as the multipath has been compensated. Examination of how the multipath on the other signals has been compensated above will however reveal that it is equivalent to the use of the "inverse channel" filter mentioned in the above-incorporated '552 patent, which is not the optimum filter when other transmitter interference is significant. However, the saved samples Wo,W1,W2 . . . can be subjected to the inverse of the "inverse channel" filter if desired, and then subjected to a different filter or indeed an iterative reapplication of the above procedure to decode a next lowest spreading factor signal from the others, and so forth. Thus one implementation of the invention can comprise successive decoding and subtraction of successively lower bit rate signals, the order of decoding in this method being in descending order of bit rate rather than in descending order of signal level, as in the incorporated references.

Figure 2:
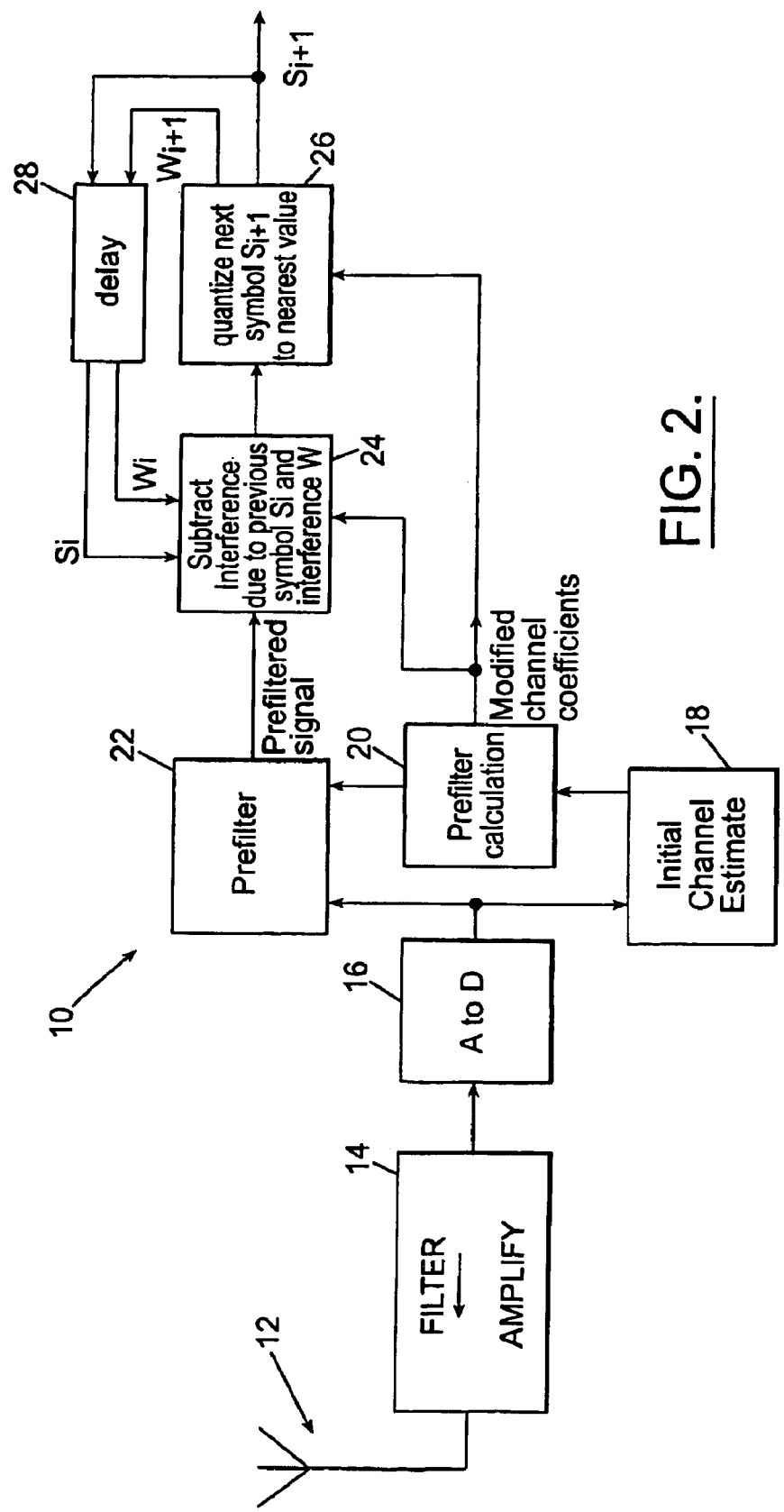
FIG. 2 is a block diagram of a receiver in accordance with the invention.

FIG. 2 illustrates a receiver 10 to decode a highest bit rate CDMA signal while compensating for non-orthogonal multipath interference. The receiver 10 is adapted for use in a mobile communications system 50, see FIG. 4, including a plurality of base stations 52 and 54 and mobile terminals 56, 58 and 60. Particularly, the receiver 10 represents a receiver in any of the mobile terminals 56, 58 and 60 or the base stations 52 and 54 used in the mobile communications system 50.

The present invention is described herein in the context of a mobile terminal. As used herein, the term "mobile terminal" may include a mobile communications radiotelephone with or without a multi-line display; a Personal Communications System (PCS) terminal that may combine a mobile communications radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

The receiver 10 includes an antenna 12 that receives radio signals which are then filtered and amplified in a block 14 to select a desired frequency channel. The selected signals are analog-to-digitally converted to representative digital samples in an A to D convertor 16 which can operate according to any conventional or known method. The digital samples are processed in an Initial Channel Estimator 18 to determine an initial channel estimate including the above-named channel coefficients Co,C1 . . . etc. The initial channel estimates are so called because they are subsequently modified when the prefilter is calculated in a prefilter calculation block 20, and also because values based on initial channel estimates, which are usually made using only known symbols inserted into the signal by the transmitter, can be refined later by using unknown symbols as now-known symbols after they have been decoded, a process known as channel tracking.

The initial channel estimates are used to determine, in the prefilter calculation block 20, the coefficients of a prefilter 22 through which the digital signal samples from the A to D converter 16 are passed in order to change the initial channel to a modified channel in which most of the wanted signal energy appears in an earliest ray and a minimum amount of wanted signal energy appears in rays earlier than that, i.e. minimum dependence on "future" symbols, only dependence on "past" symbols. The new channel estimates after the signal has been filtered by the prefilter 22 are also calculated in the prefilter calculation block 20 and passed with the prefiltered signal samples to a control represented by a subtract block 24. If the A to D convertor 16 over-samples the signal at more than one sample per symbol, prefiltering can also comprise selecting or computing only one sample per symbol as the prefilter output, the selected or computed output sample having the above-described property of maximum energy in the earliest ray, i.e. the modified channel coefficient Co may be larger than C1, C2 etc and coefficients $C_{-z}$ and earlier may be smaller.

At the subtract block 24, the above equations are used to subtract the influence of an earlier-determined symbol Si and an earlier-determined interference waveform value Wi. In a quantizer represented by a quantize block 26, the signal, with the influence of earlier symbols and interference now subtracted is separated into a quantized symbol S(i+1) and a new waveform point W(i+1). The value of W(i+1) obtained by the above solution of two simultaneous equations for the unquantized symbol value S and W may optionally be modified by plugging back into the equations the quantized value of S(i+1) to obtain a new value of W(i+1) that now depends to which symbol value S(i+1) was quantized. When a Viterbi (MSLE) algorithm is used to retain multiple possible quantizations of S(i+1), there will thus be corresponding multiple values of W(i+1). These multiple W-values may be obtained by plugging the quantized value of S into the two equations and solving them now in a least squares sense for the single remaining unknown W.

The determined S(i+1) and W(i+1) values are then fed back (decision feedback) via a delay block 28 to the subtract block 24 to subtract their influence on the next two signal samples to be decoded, and the stream Si, S(i+1) is output. The unquantized values of S may alternatively be output as "soft information" to an error correction decoder, such as a convolutional decoder. If the symbols S are binary (BPSK) bits or quaternary (QPSK) bit pairs, relating the soft output values to bit likelihood values required by the error-correction decoder is trivial. If higher order constellations such as 16QAM (quadrature amplitude modulation) or 8-PSK (phase shift keying) are used, then these M-ary symbol soft values may have to be converted to bitwise soft information, which however can be done according to the method of U.S. patent application Ser. No. 09/500,314 filed Feb. 8, 2000, entitled "Methods and Systems for Decoding Symbols by Combining Matched-Filtered Samples with Hard Symbol Decisions" which is hereby incorporated by reference herein. When more than one previously decoded symbol value and interference waveform affects the next two signal samples, the symbol and waveform values are passed through an FIR filter comprising the channel coefficients of the delayed rays C1,C2,C3 etc to determine the values that shall be subtracted, thus collecting together their contributions that are simply denoted in the above equations by "+earlier symbols".

When a Viterbi MLSE algorithm is used, such an FIR filtering and interference subtraction may be performed "per state", using the symbol and interference waveform history associated with each state, also known as "per survivor processing".

The above description was simplified to assist understanding by considering only a high bit rate signal using a 2-chip spreading code while all other signals used longer orthogonal codes. If another signal had also used an orthogonal 2-chip code, then there could only be one other interfering signal as there are only two, 2-chip orthogonal codes. The method may then advantageously be converted to a joint demodulation method to demodulate both signals at the same time, by quantizing both S and W values, the quantized W-values then representing the other signal's symbols. Joint demodulation of two overlapping signals is known in the art, as is joint demodulation of multiple overlapping signals. Where the current invention differs however, is that only the sum of multiple interfering signals need be determined as the waveform samples W, and not their individual symbols. Thus there is a considerable reduction in complexity when practicing this invention for interference cancellation.

The invention may however be extended to include the case where the high bit rate signal uses one or more orthogonal codes longer than 2 bits. For example, the wanted signal may use the 4-chip code 1010 repeated, while other signals use codes composed of the groups 1111,1100 and 1001. The wanted signal may also comprise a symbol stream using one of the above four codes plus a symbol stream using another of the codes, both of which are to be separated from each other and from the other interferers. Before describing this extension of the invention however, another generalization is discussed. A high bit rate signal using the 2-chip spreading code 11 (repeated) will be found to have a spectrum largely confined to the central part of the frequency channel, while other signals using codes composed of repeated 10 or 01 pairs have spectra largely confined to the outer parts of the channel, or vice-versa. Alternatively, a signal using complex 2-chip spreading code $(1,j)$ as opposed to the orthogonal $(1,-j)$ would be found to be confined to the upper as opposed to the lower part of the frequency channel. To avoid particular signals being restricted to only certain parts of the spectrum, resembling frequency-division multiple access (FDMA), assignment of codes to signals can be permuted from symbol to symbol thereby achieving "spectral hopping" which causes each signal to cover the whole channel spectrum in the mean. Spectral hopping is different from "frequency hopping" in that the latter comprises hopping between single sub-bands or channels, while the former comprises hopping between different spectral shapes that are not necessarily restricted to a single sub-band. Another method of ensuring that every signal covers the entire spectrum is to apply a pseudorandom sequence of complex rotations to each chip, the same rotation being applied to all signals alike so as not to disturb their mutual orthogonality. When decoding the signal as above, the known phase rotations applied to the signals must be accounted for when solving the above equations and when subtracting the influence of earlier-decoded values. This may be done by including the pseudorandom rotation with the channel coefficients used at each iteration, as a phase rotation applied at the transmitter is effectively part of the channel phase through which a symbol propagates.

Received signal sample values $Z0, Z1, Z2 \ldots$ are then described by:

$A1.Co(S0+W0)+Ao.C1(S_{-1}-W_{-1})$+earlier symbols $\ldots = Z0$ $A2.C0(S0-W0)+A1.C1(SO+WO)$+earlier symbols $\ldots = Z1$ As before, terms involving earlier values of S and W can be subtracted from both sides leaving modified values $Zo', Z1'$ on the RHS, giving the 2×2 matrix equation:—

$$\begin{pmatrix} A1.C0 & A1.C0 \\ A2.C0+A1.C1 & A1.C1-A2.C0 \end{pmatrix} \times \begin{pmatrix} S0 \\ W0 \end{pmatrix} = \begin{pmatrix} Z0' \\ Z1' \end{pmatrix}$$

where $Ao, A1, A2 \ldots$ etc is the sequence of complex chip rotations, i.e. the A-values are of amplitude unity and pseudorandom phase.

The first equation can be "derotated" by $A1^*$ and the second by $A2^*$ leaving:

$$\begin{pmatrix} Co & Co \\ Co+A2*A1.C & -Co+A2*A1.C1 \end{pmatrix} \times \begin{pmatrix} So \\ W0' \end{pmatrix} = \begin{pmatrix} A1*Z0' \\ A2*Z1' \end{pmatrix}$$

This is the same equation as before but with $Z0', Z1'$ and $C1$ replaced by phase-rotated versions of those quantities due to the A-factors. Consequently, the equations can be solved in the same way as previously described by use of the known complex spreading sequence given by the A-values to modify the phase angles of the $C1, Z0'$ and $Z1'$ values, giving $So=(A1^*.Zo'+A2^*.Z1')/2Co-A2^*A1.C1.A1^*.Zo'/2Co^2$ $Wo=(A1^*.Zo'-A2^*.Z1')/2Co+A2^*A1.C1.A1^*.Zo'/2Co^2$ or $So=(A1^*.Zo'+A2^*.Z1')/2Co-A2^*.C1.Zo'/2Co^2$ $Wo=(A1^*.Zo'-A2^*.Z1')/2Co+A2^*.C1.Zo'/2Co^2$ The first term of the solution is just the "despread value" which is produced by correlating the received signal samples with the conjugate of the complex spreading sequence while the second term represents subtraction of multipath interference. It is acceptable to subtract multipath interference so long as the prefilter has modified the channel to ensure that Co is the dominant channel coefficient containing the majority of the wanted signal energy.

One type of prefilter that ensures that all the wanted signal energy appears in a single channel coefficient is the time-reverse conjugate filter. This is an FIR filter with coefficients $C_2^*, C_1^*, Co, C^*_{-1}, C^*_{-2}$ when the channel coefficients are $C_{-2}, C_{-1}, Co, C_1, C_2$.

Convolving the channel with the time-reversed conjugate channel yields a modified channel coefficients:

$C_2^*C_{-2}$ $C_2^*C_{-1}+C_1^*C_{-2}$ $C_2^*Co+C_1^*C_{-1}+Co^*C_{-2}$ $C_2^*C_1+C_1^*Co+Co^*C_{-1}+C^*_{-1}C_{-2}$ $|C2|^2+|C_1|^2+|Co|^2+|C_{-1}|+|C_{-2}|^2$ $C_1^*C_2+Co^*C_1+C_{-1}^*Co+C_{-2}^*C_{-1}$ $Co^*C_2+C_{-1}^*C_1+C_{-2}^*Co$ $C_{-1}^*C_2+C_{-2}^*C_1$ $C_{-2}^*C_2$

It can be seen that the modified channel has a Hermitian symmetry about a center coefficient which is just the sum of the powers in all the multipath rays. If the effect of all the other rays could simply be subtracted therefore, and data decoded using only the center term, the performance would be as good as the total signal power in all rays, which is the best possible performance.

It has already been described how rays of positive delay can be subtracted by using already decoded symbols and interference waveform values. However, the above Hermitian-symmetric channel has rays of negative delay relative to the main ray, which require as yet undecoded symbols to subtract their effect. The Viterbi algorithm can be used to postulate all possible combinations of future symbols, so long as these are not too numerous, and to decode the present symbol for each postulate. When the next symbol is decoded, the previous decodings are pruned to only those that were made for that value of the next symbol, and so forth. The number of states needed for the Viterbi approach may be reasonable for binary symbols, but explodes if the data symbols are from a larger alphabet such as quaternary, 8-PSK, 16QAM or the like. Thus an alternative approach is needed when the symbol alphabet is large.

FIG. 1 illustrates a wanted signal 50 with a 2:1 spreading, which consumes the code space of two 4:1 spread signals, plus a first interfering signal 52 spread 4:1, now occupying the code space of three out of four 4:1 spread signals, and the remaining ¼ of the 4:1 code space is occupied by second and third 8:1 spread interfering signals 54 and 56.

An alternative however might be a pair of 4:1 spread wanted signals, each carrying half the data symbol rate, which occupies an equivalent amount of code space to a 2:1 spread signal. Yet another alternative would be eight 16:1 spread signals, each carrying ⅛th the data symbol rate, with the other half of the code space occupied by unspecified but orthogonal interferers. In this latter case, each wanted symbol is eight times as long in time duration as in the 2:1 spreading example. As a result, many more of the delayed rays of 1,2,3,4 etc chips delay comprise multipath interference that is largely within the duration of the same group of wanted data symbols. This can be exploited to alleviate the need for a complex Viterbi algorithm for compensating the rays of negative delay.

Figure 3:
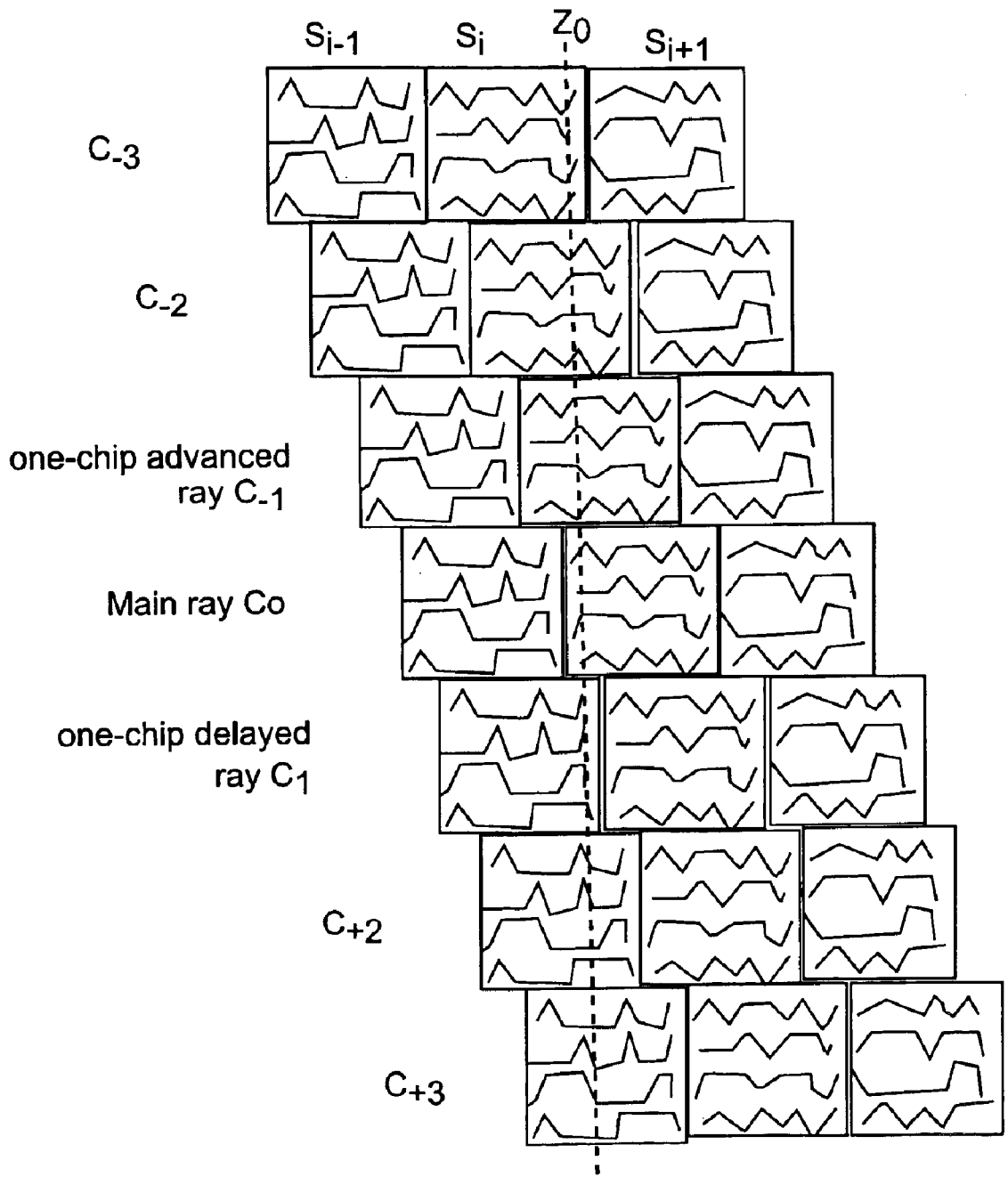
FIG. 3 illustrates superimposition of orthogonal spreading codes modulated with different data symbols in multi-code transmission.

FIG. 3 illustrates an exemplary case of such multi-code transmission. Each square of FIG. 3 represents the superimposition of N, N-chip orthogonal codes, each modulated with a different data symbol. Thus each of the N different symbols is constant for the duration of one square, but is modulated by the N chips of an orthogonal code with a chip duration of 1/Nth of a square. A square containing N such symbols of information is received through a multipath channel, and may be prefiltered as described above so that there is a dominant ray or path with channel coefficient Co. Other delayed rays have channel coefficients C1,C2 etc while rays of shorter delay than the main ray have channel coefficients $C_{-1}, C_{-2}$ etc. The symbols in successive squares are the sets labeled $S_{i-1}, S_i, S_{i+1}$ etc. To decode the symbols in a square, the signal is sampled N times yielding complex samples Zo,Z1 . . . Z(N−1). The sample position for Zo is indicated by the heavy vertical dashed line, and the squares through which it passes indicate which rays and symbols contribute to the sample value. It can be seen that Zo depends on the current symbol set $S_i$ through the main channel Co and on the current symbol set advanced by 1,2 and 3 chips through the channel coefficients $C_{-1}, C_{-2}, C_{-3}$ as well as the previous symbol set $S_{i-1}$, delayed by one, two and three chips and weighted by the channel coefficients $C_1$, $C_2$, $C_3$ respectively.

The next sample, Z1, will depend on the current symbol set Si through channels $C_1, Co, C_{-1}$, and $C_{-2}$, the previous symbol $S_{i-1}$ through channel coefficients C2 and C3, and the future symbol set $S_{i+1}$, through channel coefficient $C_{-3}$. Successive samples will depend less on past symbol set $S_{i-1}$ and more on future symbol set $S_{i-1}$. The above is entirely expressed by the matrix equations $$Zi = A.S_{i-1} + B.Si + C.S_{i+1}$$

where Zi is the sample vector (Zo . . . Z(N−1)) for square "i", the S-values are vectors of the corresponding symbol sets, and A,B and C are square matrices, the elements of which are combinations of the channel coefficients with signs given by the orthogonal code values. This equation can be rearranged to give the solution for Si as $$Si = B^{-1}Z_1 - B^{-1}A.S_{i-1} - B^{-1}C.S_{1+1}$$

Assuming the past symbol set has been decoded, but the future symbol set has not, an approximation for Si can be obtained by setting the future symbol set $S_{i+1}$ to zero. The symbols of Si may then be quantized to the nearest values in the alphabet for feeding forward when $Si_{i-1}$>is decoded. The unquantized values may be converted to bitwise soft information for feeding to an error-correction decoder. If desired, after a similar approximation has been obtained for $S_{i+1}$, it can be fed back to improve the decoding of Si. Alternatively, the similar expressions for future symbols, can be back-substituted algebraically to obtain an expression for Si of the form $$Si = Uo.Zi + U1.Z_{i+1} + U2.Z_{i+2} \ldots -V.S_{i-1}$$

where the successive matrices U1, U2 are hopefully diminishing to zero after a few terms. These matrices are constant so long as the channel coefficients and the orthogonal codes are constant, and may be precomputed in this case.

When the orthogonal codes are Fourier sequences, each "square" of FIG. 3 is transmitting its symbol set using different sub-carriers of an Orthogonal Frequency Division Multiplex (OFDM) system. When the orthogonal codes are Walsh codes however, which have been termed "sequencies" in analogy with the "frequencies" which characterize Fourier sequences, the modulation may be termed Orthogonal Sequency Division Multiplex (OSDM). As the number of chips in the code or square is increased along with the corresponding size of the symbol sets Si, i.e. as the order of the OSDM is increased, the channel delay spread is more and more confined to the limits of one square in duration, with Inter-square Interference occurring only for the chips at the edges of the square. Moreover, only the chips at the trailing edge are affected by future symbol sets, which have to be assumed to be zero to obtain the simple approximate solution derived above. Therefore the approximation will improve with increasing order of OSDM and for an expected maximum amount of delay spread in a given application, such as wireless data networks, there will be an appropriate order of OSDM that permits the approximate solution to perform adequately.

Other aspects of a complete receiver such as channel tracking may be derived from known prior art methods. For example, an initial estimate of the channel coefficients Ci may be made using known symbols transmitted by the transmitter, and then refined after decoding data symbol sets by using them as extensions of the known symbols. One or more symbols of a symbol set may be periodically set to a known value by the transmitter to assist channel tracking. One symbol in every symbol set can even be set equal to a known symbol, as with high order OSDM that only consumes 1/Nth of the channel capacity. Moreover, when one or more of the symbols in a square is known a-priori, the equations for the unknown symbols become over dimensioned and can be advantageously solved in a least-squares sense.

In the above derivation of an OSDM receiver it was assumed that all the orthogonal codes were carrying symbols to be decoded. If it is desired to omit decoding some symbols of a set and to decode a subset of n symbols of the set only, where n<N, then the size of the above matrices may be reduced from N×N to N×(n+1), the first n rows corresponding to symbols desired to be decoded and quantized, and the (n+1)'th row corresponding to an interfering waveform which is the sum of the remaining symbols not desired to be decoded, and moreover not therefore quantized when fed forward to subtract delayed ISI when decoding the next symbol. This represents the generalization of the 2×2 case used in introducing the invention, which, in its interference-cancellation mode, comprises Decision Feedback of previously decoded values some of which are quantized and some of which are not quantized, thereby achieving the subtraction of multiple interferers in a single step.

As has been shown in U.S. Pat. No. 5,937,015 to Dent and Bottomley, entitled "Interference Mitigation by Joint Decoding of Overlapped Signals", error correction coding may be employed to improve the reliability of already-decoded symbols that are used in decoding further symbols, with appropriate choice of interleaving pattern. The interleaving pattern determines the order in which bits from a receiver such as disclosed in this invention are fed to the error correction decoder. The preferred interleaving order is to select soft-bits from the just-decoded symbol set to feed to the error correction decoder followed by soft-bits that remain from previously decoded symbol sets. That allows the latter, now assumed to be more reliable bits, to flush through the bits from the just-decoded symbol thereby improving the reliability of bits from the just decoded symbol. These will be used to flush through soft bits from the next-decoded symbol, and so on. The '015 patent is hereby incorporated by reference herein together with its parent, U.S. Pat. No. 5,673,291 entitled "Simultaneous Demodulation and Decoding of a Digitally Modulated Radio Signal using Known Symbols"

The present invention has been described with respect to a block diagram for a receiver, illustratively in a mobile terminal or a base station. It will be understood that each block of the block diagram can be implemented by computer program instructions. These program instructions may be provided to a processor to produce a machine, such that the instructions which execute on the processor create means for implementing the functions specified in the blocks. The computer program instructions may be executed by a processor to cause a series of operational steps to be performed by the processor to produce a computer implemented process such that the instructions which execute on the processor provide steps for implementing the functions specified in the blocks. Accordingly, the illustrations support combinations of means for performing a specified function and combinations of steps for performing the specified functions. It will also be understood that each block and combination of blocks can be implemented by special purpose hardware-based systems which perform the specified functions or steps, or combinations of special purpose hardware and computer instructions.

A person skilled in the art may make numerous modifications or adaptations to receivers and transmitters based on the above teachings and those of the incorporated disclosures, while remaining within the scope and spirit of this invention as described by the attached claims.

I claim:

1. A method of decoding quantized and unquantized wanted data symbols from received signal samples, comprising:

processing a group of currently received signal samples to determine a corresponding current set of unquantized wanted data symbols and an interfering waveform representative of a sum of other unwanted data symbols by subtracting an amount of a previously decoded set of quantized wanted symbols and a previously determined interfering waveform; and quantizing said determined current set of unquantized wanted symbols to obtain corresponding quantized symbols.

2. The method of claim 1 wherein processing a group of currently received signal samples further comprises determining a set of channel coefficients characterizing multipath propagation.

3. The method of claim 2 wherein processing a group of currently received signal samples further comprises filtering said received signal samples using a filter based on said channel coefficients.

4. The method of claim 3 wherein said filter comprises a time-reversed conjugate channel filter.

5. The method of claim 1 wherein said current set of unquantized wanted symbols comprises only one wanted symbol.

6. A method of decoding quantized and unquantized wanted data symbols from received signal samples, comprising:

processing a group of currently received signal samples to determine a corresponding current set of unquantized wanted data symbols and an interfering waveform representative of a sum of other unwanted data symbols by subtracting an amount of a previously decoded set of quantized wanted symbols and a previously determined interfering waveform; and quantizing said determined current set of unquantized wanted symbols to obtain corresponding quantized symbols, wherein said current set of unquantized wanted symbols comprises only one wanted symbol, and wherein processing a group of currently received signal samples comprises combining a pair of successively received signal samples in a first combining way to obtain said current unquantized symbol and combining the same pair of samples in a second combining way to obtain a value of said interfering waveform.

7. The method of claim 6 wherein said first and second combining ways are orthogonal combining ways.

8. The method of claim 6 wherein said first and second combining ways comprise multiplying said received signal sample pairs by a conjugate of a pair of complex spreading code values.

9. The method of claim 2 wherein said channel coefficients are determined by correlating said received signal samples with known ones of said data symbols.

10. The method of claim 9 wherein said known symbols are known by both a transmitter and a receiver.

11. The method of claim 9 wherein said known symbols comprise previously decoded symbols.

12. The method of claim 11 wherein said known symbols comprise previously decoded symbols and using an error correction decoder.

13. A method of decoding quantized and unquantized wanted data symbols from received signal samples, comprising:

processing a group of currently received signal samples to determine a corresponding current set of unquantized wanted data symbols and an interfering waveform representative of a sum of other unwanted data symbols by subtracting an amount of a previously decoded set of quantized wanted symbols and a previously determined interfering waveform;

quantizing said determined current set of unquantized wanted symbols to obtain corresponding quantized symbols;

hypothesizing a set of said quantized wanted symbols not yet decoded;

subtracting interference caused by said not yet decoded wanted symbols from said signal samples; and using a Viterbi Maximum Likelihood Sequence Estimator to determine a sequence of hypothesized quantized data symbols having a smallest measure of quantizing error between the unquantized symbols and the quantized symbols.

14. A method of decoding Orthogonal Sequency Division Multiplexed symbols from signal samples received through a multipath channel, comprising:

filtering the received signal samples using a filter based on multipath channel coefficients;

grouping the filtered signal samples into vectors of N signal samples;

computing a first and a second N×N complex matrix based on multipath channel coefficients and a set of orthogonal codes used for said Orthogonal Sequency Division Multiplexer symbols;

multiplying a previously decoded and quantized set of symbols by said second matrix and combining it with a product of said first matrix with a current group of N filtered signal samples to obtain a current set of unquantized decoded symbols; and quantizing said current set of unquantized symbols to obtain a current decoded and quantized set of symbols.

15. The method of claim 14 wherein said previously decoded and quantized set of symbols are further processed using an error correction decoder to improve decoding reliability.

16. The method of claim 15 wherein said previously decoded and quantized set of symbols are the result of processing the corresponding set of unquantized symbols using an error correction decoder.

17. A method of decoding Orthogonal Sequency Division Multiplexed symbols from signal samples received through a multipath channel, comprising:

prefiltering the received signal samples using a prefilter based on multipath channel coefficients;

grouping the prefiltered signal samples into vectors of N signal samples;

computing a series of N×N complex matrices comprising at least a first and a second matrix and a final matrix based on said multipath channel coefficients and a set of orthogonal codes used for said Orthogonal Sequency Division Multiplexer symbols;

multiplying a current one of said N-sample vectors by a corresponding one of said at least first and second matrices and sample vectors received successively later in time by successive ones of said matrices and combining the products and further combining with the product of a previously decoded and quantized set of symbols by said final matrix to obtain a current set of unquantized decoded symbols; and quantizing said current set of unquantized symbols to obtain a current decoded and quantized set of symbols.

18. The method of claim 17 wherein said previously decoded and quantized set of symbols are further processed using an error correction decoder to improve decoding reliability.

19. The method of claim 18 wherein said previously decoded and quantized set of symbols are the result of processing the corresponding set of unquantized symbols using an error correction decoder.

20. A method for decoding overlapping data symbols modulated with mutually orthogonal spreading codes in which some of said symbols are known a-priori, comprising:

receiving blocks of signal samples through a channel suffering from multipath propagation, a number of signal samples in a block being equal to a length of said orthogonal spreading codes;

subtracting from said signal samples intersymbol interference (ISI) related to previously decoded symbols and to said known symbols to produce corresponding blocks of ISI-compensated signal samples; and processing said ISI-compensated sample blocks to obtain a least-squares solution for the remaining, unknown data symbols each quantized to a nearest symbol in the alphabet of symbols with minimum mean-square quantizing error.

21. The method of claim 20 wherein said subtracted intersymbol interference is based on channel coefficients that describe said multipath propagation.

22. The method of claim 21 wherein said channel coefficients are estimated by correlating said received signal samples with said known symbols.

23. A receiver for decoding quantized and unquantized wanted data symbols from received signal samples, comprising:

a control adapted to process a group of currently received signal samples to determine a corresponding current set of unquantized wanted data symbols and an interfering waveform representative of a sum of other unwanted data symbols by subtracting an amount of a previously decoded set of quantized wanted symbols and a previously determined interfering waveform; and a quantizer adapted to quantize said determined current set of unquantized wanted symbols to obtain corresponding quantized symbols.

24. The receiver of claim 23 further comprising a channel estimator for determining a set of channel coefficients characterizing multipath propagation.

25. The receiver of claim 24 further comprising a filter for filtering said received signal samples based on said channel coefficients.

26. The receiver of claim 25 wherein said filter comprises a time-reversed conjugate channel filter.

27. The receiver of claim 23 herein said current set of unquantized wanted symbols includes only one wanted symbol.

28. A receiver for decoding quantized and unquantized wanted data symbols from received signal samples, comprising:

a control adapted to process a group of currently received signal samples to determine a corresponding current set of unquantized wanted data symbols and an interfering waveform representative of a sum of other unwanted data symbols by subtracting an amount of a previously decoded set of quantized wanted symbols and a previously determined interfering waveform; and a quantizer adapted to quantize said determined current set of unquantized wanted symbols to obtain corresponding quantized symbols, wherein said current set of unquantized wanted symbols includes only one wanted symbol, and wherein said control combines a pair of successively received signal samples in a first combining way to obtain said current unquantized symbol and combines the same pair of samples in a second combining way to obtain a value of said interfering waveform.

29. The receiver of claim 28 wherein said first and second combining ways are orthogonal combining ways.

30. The receiver of claim 28 wherein said first and second combining ways comprise multiplying said received signal sample pairs by a conjugate of a pair of complex spreading code values.

31. The receiver of claim 24 wherein said channel estimator determines said channel coefficients by correlating said received signal samples with known ones of said data symbols.

32. The receiver of claim 31 wherein said known symbols include previously decoded symbols.

33. A mobile terminal used in a mobile communications system decoding overlapping data symbols modulated with mutually orthogonal spreading codes in which some of said symbols are known a-priori, comprising:
- a receiver receiving blocks of signal samples through a channel suffering from multipath propagation, a number of signal samples in a block being equal to a length of said orthogonal spreading codes;
- a control subtracting from said signal samples intersymbol interference (ISI) related to previously decoded symbols and to said known symbols to produce corresponding blocks of ISI-compensated signal samples; and
- a quantizer processing said ISI-compensated sample blocks to obtain a least-squares solution for the remaining, unknown data symbols each quantized to a nearest symbol in the alphabet of symbols with minimum mean-square quantizing error.

34. The mobile terminal of claim 33 wherein said subtracted intersymbol interference is based on channel coefficients that describe said multipath propagation.

35. The mobile terminal of claim 34 wherein said channel coefficients are estimated by correlating said received signal samples with said known symbols.

36. A base station used in a mobile communications system decoding overlapping data symbols modulated with mutually orthogonal spreading codes in which some of said symbols are known a-priori, comprising:
- a receiver receiving blocks of signal samples through a channel suffering from multipath propagation, a number of signal samples in a block being equal to a length of said orthogonal spreading codes;
- a control subtracting from said signal samples intersymbol interference (ISI) related to previously decoded symbols and to said known symbols to produce corresponding blocks of ISI-compensated signal samples; and
- a quantizer processing said ISI-compensated sample blocks to obtain a least-squares solution for the remaining, unknown data symbols each quantized to a nearest symbol in the alphabet of symbols with minimum mean-square quantizing error.

37. The base station of claim 36 wherein said subtracted intersymbol interference is based on channel coefficients that describe said multipath propagation.

38. The base station of claim 37 wherein said channel coefficients are estimated by correlating said received signal samples with said known symbols.

39. A mobile communications system receiver reducing interference between transmissions of wanted signals and unwanted interfering signals, comprising:
- a control adapted to process a group of currently received signal samples to determine a corresponding current set of unquantized wanted data symbols and an interfering waveform representative of a sum of other unwanted interfering data symbols by subtracting an amount of a previously decoded set of quantized wanted symbols and a previously determined interfering waveform; and
- a quantizer adapted to quantize said determined current set of unquantized wanted symbols to obtain corresponding quantized symbols.

40. The mobile communications system receiver of claim 39 further comprising a channel estimator for determining a set of channel coefficients characterizing multipath propagation.

41. The mobile communications system of claim 40 further comprising a filter for filtering said received signal samples based on said channel coefficients.

42. The mobile communications system receiver of claim 41 wherein said filter comprises a time-reversed conjugate channel filter.

43. The mobile communications system receiver of claim 39 wherein said current set of unquantized wanted symbols includes only one wanted symbol.

44. A mobile communications system receiver reducing interference between transmissions of wanted signals and unwanted interfering signals, comprising:
- a control adapted to process a group of currently received signal samples to determine a corresponding current set of unquantized wanted data symbols and an interfering waveform representative of a sum of other unwanted interfering data symbols by subtracting an amount of a previously decoded set of quantized wanted symbols and a previously determined interfering waveform; and
- a quantizer adapted to quantize said determined current set of unquantized wanted symbols to obtain corresponding quantized symbols, wherein said current set of unquantized wanted symbols includes only one wanted symbol, and wherein said control combines a pair of successively received signal samples in a first combining way to obtain said current unquantized symbol and combines the same pair of samples in a second combining way to obtain a value of said interfering waveform.

45. The mobile communications system receiver of claim 42 wherein said channel estimator determines said channel coefficients by correlating said received signal samples with known ones of said data symbols.

46. The mobile communications system receiver of claim 45 wherein said known symbols include previously decoded symbols.

47. The mobile communications system receiver of claim 39 wherein said receiver comprises a mobile terminal receiver.

48. The mobile communications system receiver of claim 39 wherein said receiver comprises a base station receiver.

* * * * *